United States Patent Office 3,253,671
Patented May 31, 1966

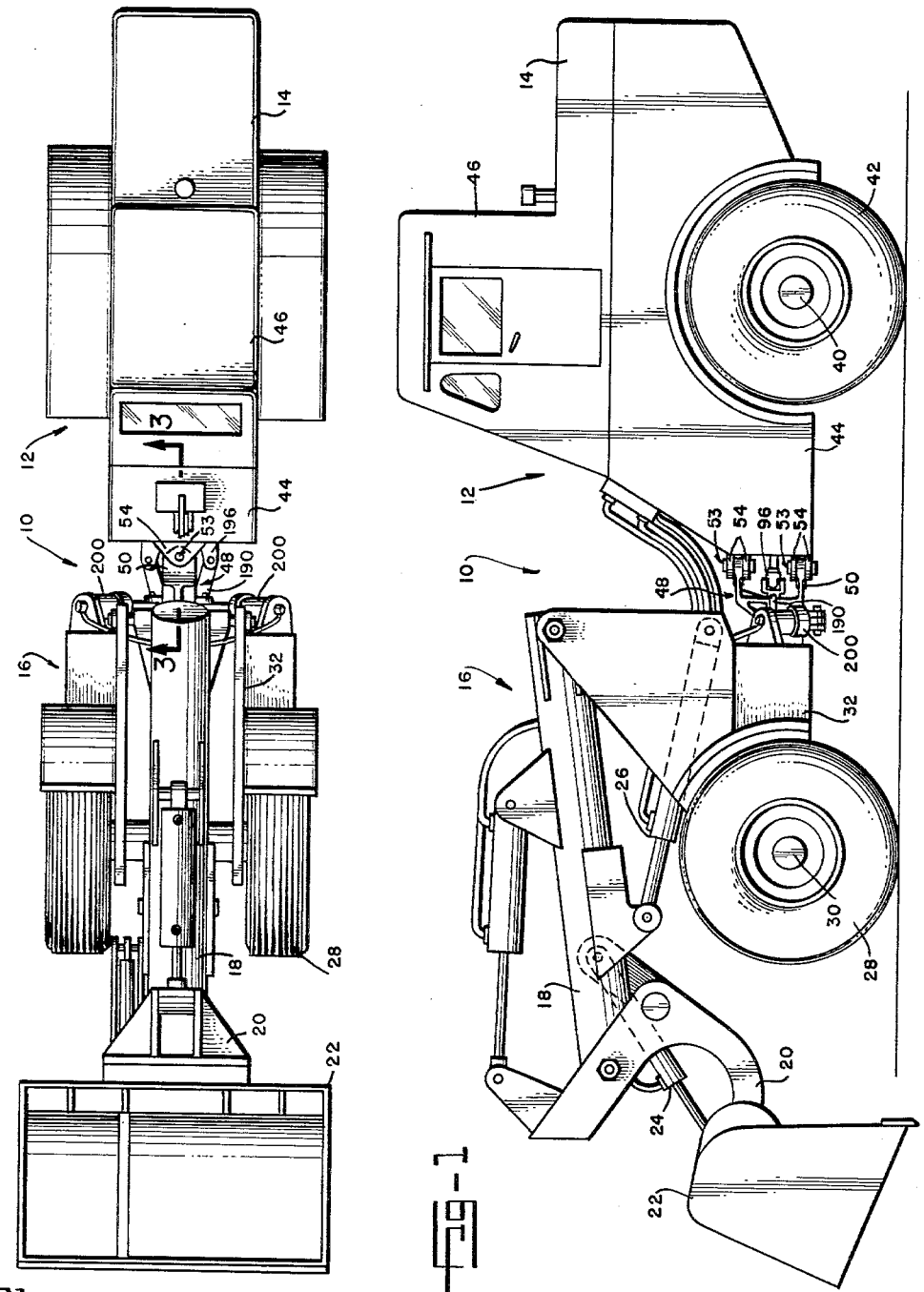

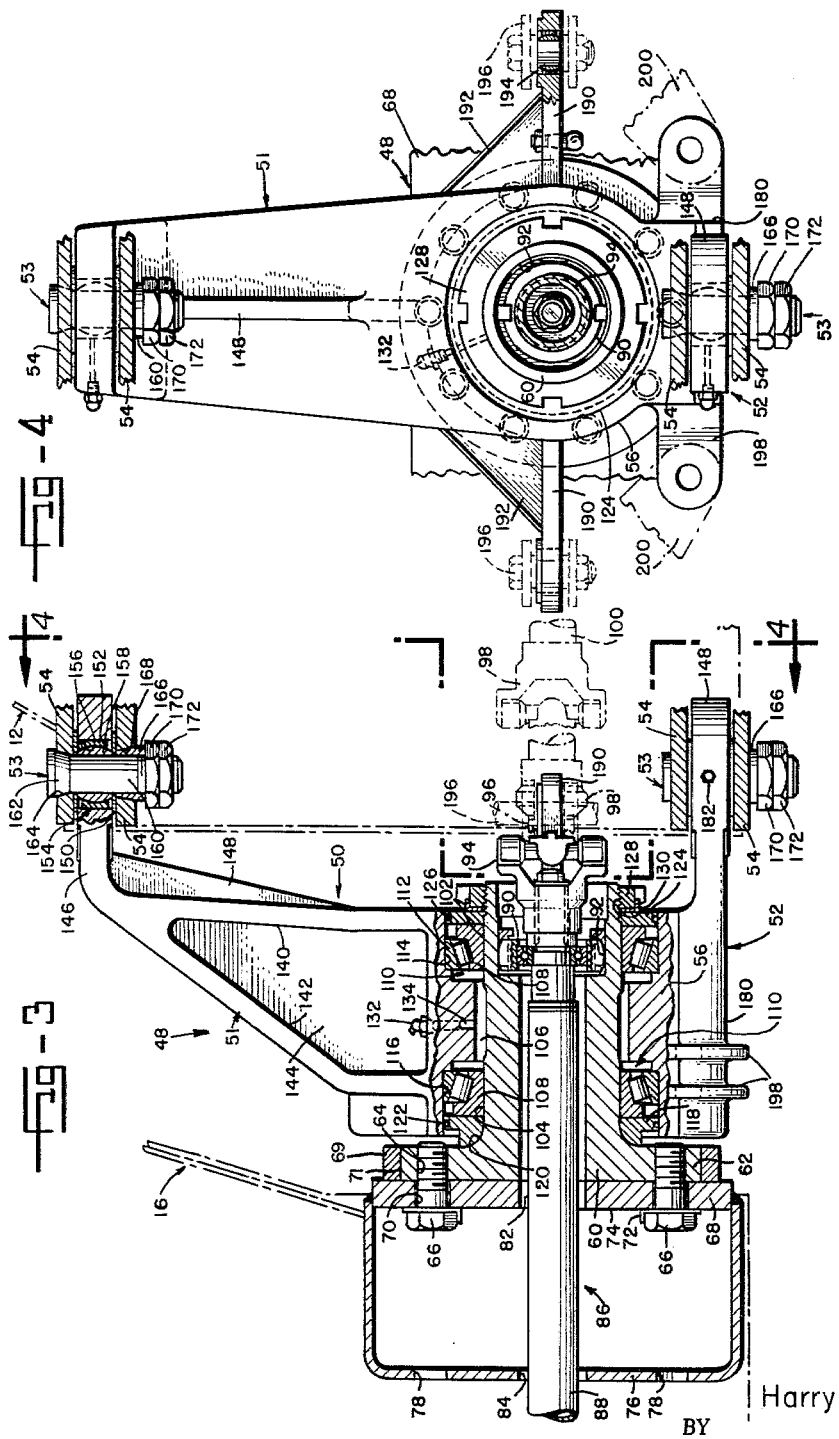

3,253,671
CLOSE-COUPLED ARTICULATED VEHICLE
Harry L. Fielding, Portland, Oreg., assignor to Mixermobile Manufacturers, Inc., Portland, Oreg., a corporation of Oregon
Filed Jan. 27, 1964, Ser. No. 340,215
4 Claims. (Cl. 180—51)

This invention relates to an articulated vehicle, and more particularly to a close-coupled, articulated joint structure for a front end loader.

In an articulated vehicle such as, for example, a front end loader and the like, in which there is provided a front frame and a rear frame, each carried by a set of wheels and in which the frames are pivotal relative to one another about a generally vertical pivot axis for steering the vehicle and in which one of the frames is pivotal about a horizontal pivot axis relative to the other frame to enable the vehicle to travel over rough terrain with all the wheels on the ground, there has been provided in the past an articulating or connecting joint structure between the two frames which included a yoke having arms connected to the rear frame for pivotal movement about a vertical axis. The yoke also includes a tubular portion extending forwardly from the arms and through a horizontal bearing extending into and carried by the front frame. This joint structure has the disadvantage of spacing the bearing substantially from the vertical pivot, and has been difficult to maintain and repair. It would be desirable to provide an articulated joint structure having a close spacing between the vertical pivot and the horizontal bearing structure to decrease bearing load and which is easily repaired and maintained.

An object of the invention is to provide a new and improved articulated vehicle.

Another object of the invention is to provide a close-coupled, articulated joint structure for a front end loader.

A further object of the invention is to provide a front end loader having a rear frame connected to a yoke on a vertical pivot and a front frame connected rigidly to a shaft journaled in a tubular bearing carried by the yoke.

Another object of the invention is to provide in a front end loader a close-coupled articulated joint structure having a yoke including arms projecting from a tubular bearing journaling a shaft detachably secured to the rear of the frame of the front section of the loader.

The invention provides an articulated vehicle including a load carrying front section and a rear section connected together by a close-coupled articulated joint structure for relative movement about both a generally vertical pivot axis and a generally horizontal pivot axis. The joint structure includes a yoke having a pair of arms connected to the frame of the rear sections for pivotal movement about the vertical pivot axis. The arms project outwardly from and are rigidly mounted on a tubular bearing housing, and a shaft secured rigidly to the frame of the front section is journaled in the bearing housing. Preferably the shaft has a flange detachably secured to a cross member of the frame of the front section for quick replacement or repair.

A complete understanding of the invention may be obtained from the following detailed description of an articulated vehicle forming a specific embodiment thereof, when read in conjunction with the appended drawings, in which:

FIG. 1 is a side elevation view of an articulated vehicle forming one embodiment of the invention with the steering mechanism broken away to more clearly show the structure of the invention;

FIG. 2 is a top plan view of the vehicle of FIG. 1;

FIG. 3 is an enlarged vertical sectional view taken along line 3—3 of FIG. 2; and FIG. 4 is an enlarged vertical sectional view taken substantially along line 4—4 of FIG. 2.

Referring now in detail to the drawings, there is shown therein an articulated vehicle 10 forming a specific embodiment of the invention. The vehicle 10 is a front end loader generally like the front end loader disclosed in U.S. Patent 2,811,265 except as disclosed herein. The vehicle 10 includes a rear section 12 (FIGS. 1 and 2) having an engine (not shown) in a housing 14 and a front section 16 carrying a boom 18. The boom carries a bucket support 20, which supports pivotally a bucket 22 movable relative to the support by a hydraulic mechanism 24. A hoist cylinder 26 serves to raise and lower the boom 18, and the boom carries the bucket and any load therein. The front section 16 includes a pair of wheels 28 mounted rotatably on an axle 30 fixed to front frame 32 of the front section 16. An axle 40 carries a pair of wheels 42 and is supported by rear frame 44 of the rear section 12. A cab 46 is also supported by the frame 44.

A close-coupled articulated joint structure 48 includes a yoke 50 pivotal on pins carried by forked, hinging brackets 54 and having pivotally connecting arms 51 and 52 fixed rigidly to the rear frame 44, whereby the yoke 50 is mounted pivotally relative to the frame 44 on a generally vertical pivot axis. The yoke 50 carries rigidly between the arms thereof a tubular bearing housing 56 (FIG. 3), which journals and holds against thrust a sleeve-like spindle or shaft 60 having a forward flange 62. The flange 62 has tapped bores 64 into which are screwed cap screws 66 to detachably secure the spindle to a cross member 68 of the front frame 32. A sleeve 69 rigid with the cross member 68 provides a socket for the circular flange 62 and has a tapered opening 71. The screws 66 project through bores 70 in a heavy, plate-like portion of the cross member 68, and are secured against accidental loosening by tabs 72 of a lock washer plate 74. A cup-shaped cover 76 having bores 78 aligned with the bores 70 fits detachably on the cross member 68. The spindle 60, the cross member 68 and the cover 76 have respectively an axial bore 80 and bores 82 and 84 aligned with the bore 80 to provide clearance for a front axle drive line 86. The drive line 86 includes shaft 88 journaled by a self-aligning bearing 90 seated in counterbore 92, universal joint 94, shaft 96, universal joint 98 and driving shaft 100.

The spindle 60 has annular bearing seats 102 and 104 separated by shallow groove 106, and closely and slidably supporting inner races 108 of radial-and-thrust bearings 110. Outer races 112 of the bearings fit into counterbores 114 and 116 in the bearing housing 56. A filler ring 118 spaces inner race 108 from strengthening fillet 120 with which the ring 118 fits, and is externally grooved to carry a sealing O-ring 122. A rear sealing plate 124 slidable on the spindle carries in a groove therein a sealing O-ring 126. A spanner type nut 128 is screwed onto threaded rear end portion 129 of the spindle, and holds the bearings 110, filler ring 118 and sealing plate 124 in position on the spindle along with the action of end shoulders of the counterbores 114 and 116. A lock washer 130 holds the nut 128 against accidental loosening. A grease fitting 132 is provided to supply lubricant through bore 134 to the bearings 110.

The arm 51 has heavy, forked, bar portions 140 and 142 strengthened by web 144, and a lug 146. A gusset 148 strengthens the lug 146. The lug 146 and a lug 148 of the lower arm 52 fit between pairs of thin washers 150 positioned between the arms of the forked brackets 54 and hold outer members 152 of self-aligning bearings 154 in bores 156. Inner bearing members 158 fit closely on shanks 160 of the pins 53. The heads of the pins 53 have tapered portions 162 fitting into tapered bores 164 in the upper members of the brackets 54. Tapered sleeves 166 are pressed into tapered bores 168 in the lower arms of the brackets 54 by nuts 170 locked on the pins 52 by lock nuts 172. The arm 52 has a heavy, bar-like, base portion 180 integral with the lower portion of the housing 56. Set screws 182 lock the bearing members 154 to the lugs 146 and 148.

The housing 56 of the yoke 48 carries at its sides and rigidly therewith opposed arms 190 (FIG. 4) braced by gussets 192 and carrying self-aligning bearings 194, which form part of the steering mechanism including elements 196. Clevices 198 integral with the heavy, bar-like base portion 180 of the arm 52 mount pivotally the lower ends of oscillation-restraining cylinders 200 of the type disclosed and claimed in my copending application Serial No. 313,115, filed October 1, 1963.

The joint structure 48 connects the rear section 12 and the front section 16 together for pivotal movement about the vertical pivot axis defined by the pins 53 and for horizontal pivotal movement or oscillation about the horizontal pivot axis defined by the longitudinal axis of the bearing housing 56 and the spindle 60. Since the yoke 50 is, in effect, generally U-shaped rather than Y-shaped and the spindle 60 projects into the yoke, the bearings 110 are spaced closely to the vertical pivot axis and the joint structure 48 is very closely coupled. This construction also permits the entire compact joint structure 48 to be entirely to the right of the cross member 68, as viewed in FIG. 3, so as to provide clearance at the left of the cross member 68.

The nut 128 is in a convenient, easily accessible position for release to detach the yoke 50 from the spindle 60, and the nut 128 and threaded end of the spindle are in protected positions between the two arms 51 and 52 of the yoke 50. Also, the spindle 60 can be easily detached from the front section for repair or replacement merely by unscrewing the cap screws 66.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an articulated front end loader,
   a bearing housing having a horizontal bore therethrough, a first counterbore at one end thereof, and a second counterbore at the other end thereof,
   a first thrust bearing mounted in the first counterbore,
   a second thrust bearing mounted in the second counterbore,
   a spindle having a shouldered end engaging the first thrust bearing and a shank extending through the thrust bearings and having a threaded end portion extending beyond the second thrust bearing,
   nut means screwed onto the threaded portion of the shank and pressing against the second bearing,
   a pair of frames,
   means securing the shouldered end of the spindle to one of the frames in a position in which the spindle extends horizontally from said one of the frames and longitudinally of that frame,
   pivot means having a vertical pivot axis carried by the other frame,
   and means extending laterally from the sides of the bearing housing and mounting the bearing housing pivotally to the pivot means for pivotal movement of the bearing housing about said vertical pivot axis.

2. The articulated front end loader of claim 1 including
   a first sealing plate means positioned between the shouldered end of the spindle and the first thrust bearing,
   and a second sealing plate means positioned between the nut means and the second thrust bearing.

3. The articulated front end loader of claim 2 wherein the spindle has a fillet at the shouldered end of the spindle,
   and the first sealing plate spaces the fillet longitudinally from the first thrust bearing.

4. The articulated front end loader of claim 1 including
   a shaft,
   the spindle having a bore therethrough and a counterbore through which the shaft extends,
   and a self-aligning bearing mounted in the counterbore in the spindle and journaling the shaft.

References Cited by the Examiner

UNITED STATES PATENTS

| 1,512,611 | 10/1924 | Konetsky | 280—492 X |
| 2,400,218 | 5/1946 | Akers | 180—52 X |
| 2,835,397 | 5/1958 | Wagner | 180—51 X |
| 3,057,319 | 10/1962 | Wagner | 180—8 X |
| 3,067,831 | 12/1962 | Willock | 180—52 X |
| 3,115,205 | 12/1963 | Ewing | 280—109 X |

FOREIGN PATENTS

| 840,263 | 7/1960 | Great Britain. |
| 486,449 | 11/1953 | Italy. |

BENJAMIN HERSH, *Primary Examiner.*

A. HARRY LEVY, *Examiner.*

W. A. MARCONTELL, *Assistant Examiner.*